United States Patent [19]
Bobrin

[11] 3,737,842
[45] June 5, 1973

[54] FEATURE RECOGNITION TECHNIQUES

[75] Inventor: Marshall C. Bobrin, Philadelphia, Pa.

[73] Assignee: The United States of America as represented by the Secretary of the Navy, Washington, D.C.

[22] Filed: Mar. 30, 1966

[21] Appl. No.: 540,148

[52] U.S. Cl. .......................... 340/4 R, 324/4, 324/8, 324/77 E
[51] Int. Cl. ........................................... G01r 33/02
[58] Field of Search .......................... 324/4, 8, 77 E; 340/3 M, 4 R

[56] References Cited

UNITED STATES PATENTS

| | | | |
|---|---|---|---|
| 2,632,884 | 3/1953 | Murphy | 324/8 X |
| 2,705,742 | 4/1955 | Miller | 324/77 E X |
| 2,967,998 | 1/1961 | Hurvitz | 324/77 E |
| 3,051,897 | 8/1962 | Peterson et al. | 324/77 E |
| 3,102,928 | 9/1963 | Schroeder | 324/77 E X |
| 3,196,212 | 7/1965 | Horwitz | 324/77 E X |
| 3,215,934 | 11/1965 | Sallen | 324/77 E X |
| 3,140,710 | 7/1964 | Glassner et al. | 324/77 E X |

Primary Examiner—Richard A. Farley
Attorney—G. J. Rubens and Henry Hansen

[57] ABSTRACT

A feature recognition system for extracting transient signal information from a signal-like noise background by separating a time domain signal into a plurality of frequency-time domain signals by frequency selective filters. Each of the filtered outputs is converted to unidirectional signals and then displayed on a chart recorder from which the presence of a signal is determined on the basis of one or more of three criteria. The first criteria is maximum energy in a predetermined one of the selected frequencies; the second criteria is the time convergence of the time-tracings of peaks and troughs of the unidirectional signal lobes at the higher frequencies; and the third criteria is the difference in shape factors for sgnal information as opposed to noise information.

1 Claim, 7 Drawing Figures

Patented June 5, 1973

INVENTOR.
MARSHALL C. BOBRIN

BY

ATTORNEY

INVENTOR.
MARSHALL C. BOBRIN

ATTORNEY

INVENTOR.
MARSHALL C. BOBRIN

BY

ATTORNEY

FEATURE RECOGNITION TECHNIQUES

The invention described herein may be manufactured and used by or for the Government of the United States of America for governmental purposes without the payment of any royalties thereon or therefor.

The present invention relates to feature recognition systems and more particularly to a system for recognizing transient submarine signals from a signal-like noise background.

In the field of submarine detection and recognition, it has been the general practice to employ magnetic anomaly detection (MAD) devices to detect the presence of large magnetic bodies such as submarines under the surface of the ocean. These devices produce an output signal which is a representation of a variation in the earth's magnetic field due to the presence of a submarine or other metallic material. The operation of these devices is described in *Magnetic Airborne Detectors*, Volume No. 5 of Summary Technical Report of Division 6, National Defense Research Committee, 1946.

In general, the MAD equipment is located in an aircraft which is flown above the surface of the water in an area in which the presence of a submarine is suspected. The principal problem of submarine detection in which the MAD techniques are employed is that at high altitudes and large slant ranges the signal amplitude from a submarine greatly decreases (as the cube root of the distance) from the detection system. Accordingly, under these conditions, the signals virtually disappear into the noise background which has characteristics very similar to the signals.

Prior art systems employed a human operator to discern actual submarine signals from the surrounding noise by depending upon the operator's ability to recognize characteristics or patterns in the displayed wave shapes from previously memorized patterns which were probably acquired in a non-noise environment. At low altitudes and short slant ranges the MAD signals are of sufficient amplitude to discriminate between real signals and the background noise and even in areas of high metallic background, the period of the submarine signal is sufficiently shorter than that of the background noise so that an operator may achieve a high degree of accuracy in recognizing submarines; however, at high altitudes, it becomes exceedingly difficult for an operator to distinguish submarine signals from the background noise.

It has been found that certain signals, and in particular submarine signals, exhibit a particular frequency characteristic or signature independent of its amplitude, and a spectral analysis of the waveform can often differentiate between these signals and background transient noise. The present invention, accordingly, fulfills this need by providing a spectral analysis of signal and noise information to determine the presence of signal information in a signal-like noise environment.

The general purpose of the present invention is therefore to provide a device which can extract transient signal information from background transient noise even in a high transient noise condition.

An object of the present invention is to provide a device that separates transient signal information from transient noise signals.

Another object of the invention is to provide a device for extracting the characteristics uniquely possessed by submarine signal information and not by the signal-like background noise and displaying this information for analysis.

A further object of the invention is to simplify the analysis of submarine signatures by providing a device which will allow an operator to make a decision on the presence or absence of a submarine signal.

Still a further object of the invention is to provide distinguishing characteristics between signal and noise information so that a decision can be made on the presence or absence of a signal even in a high noise environment.

Other objects and many of the attendant advantages of this invention will be readily appreciated as the same becomes better understood by reference to the following detailed description when considered in connection with the accompanying drawings wherein.

Figure 6A:
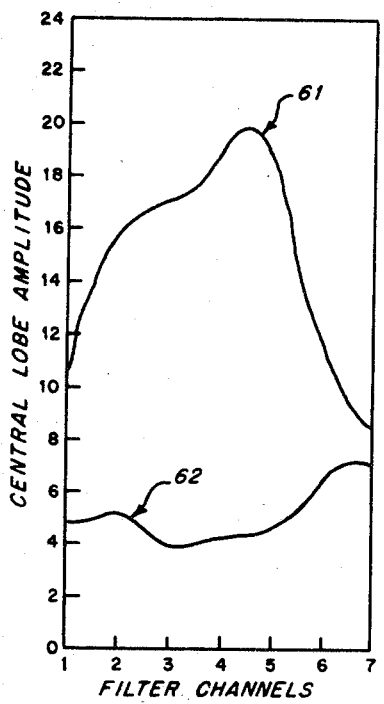
Figure 6B:
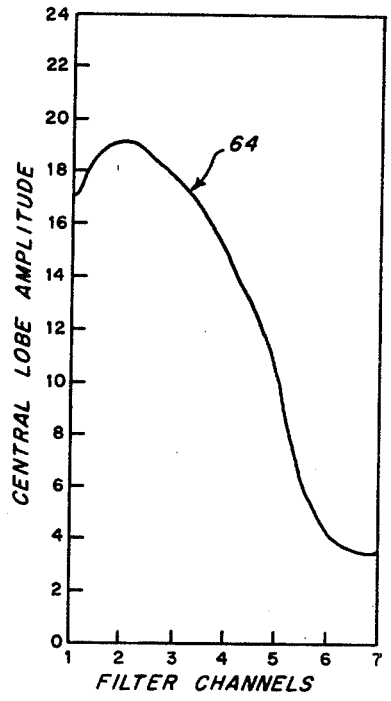
Figure 5:
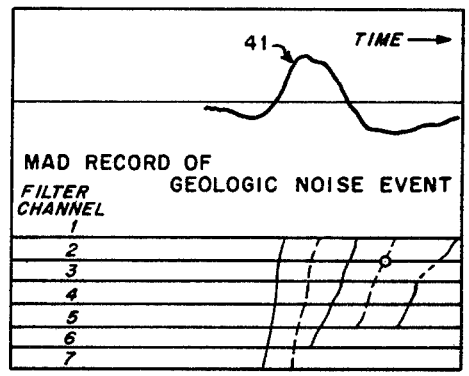
Figure 4:
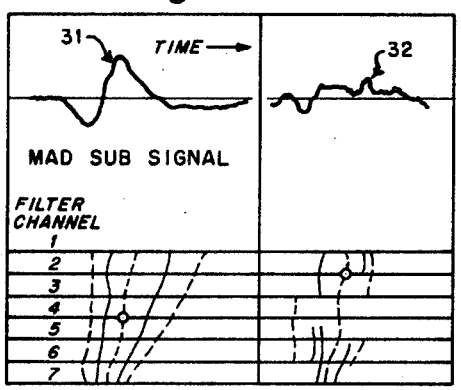

FIGS. 4 and 5 show typical time tracings for lobe amplitudes as a function of filter frequency; and FIGS. 6a and 6b illustrate the central lobe amplitudes as a function of filter frequency for the time tracings of FIGS. 4 and 5.

Briefly, the invention provides a system for feature recognition of transient signal information based on the separation of the various frequency components that constitute a particular signal signature from those of transient noise signals which have characteristics similar to the signal in the time domain but different in the frequency domain.

Figure 1:
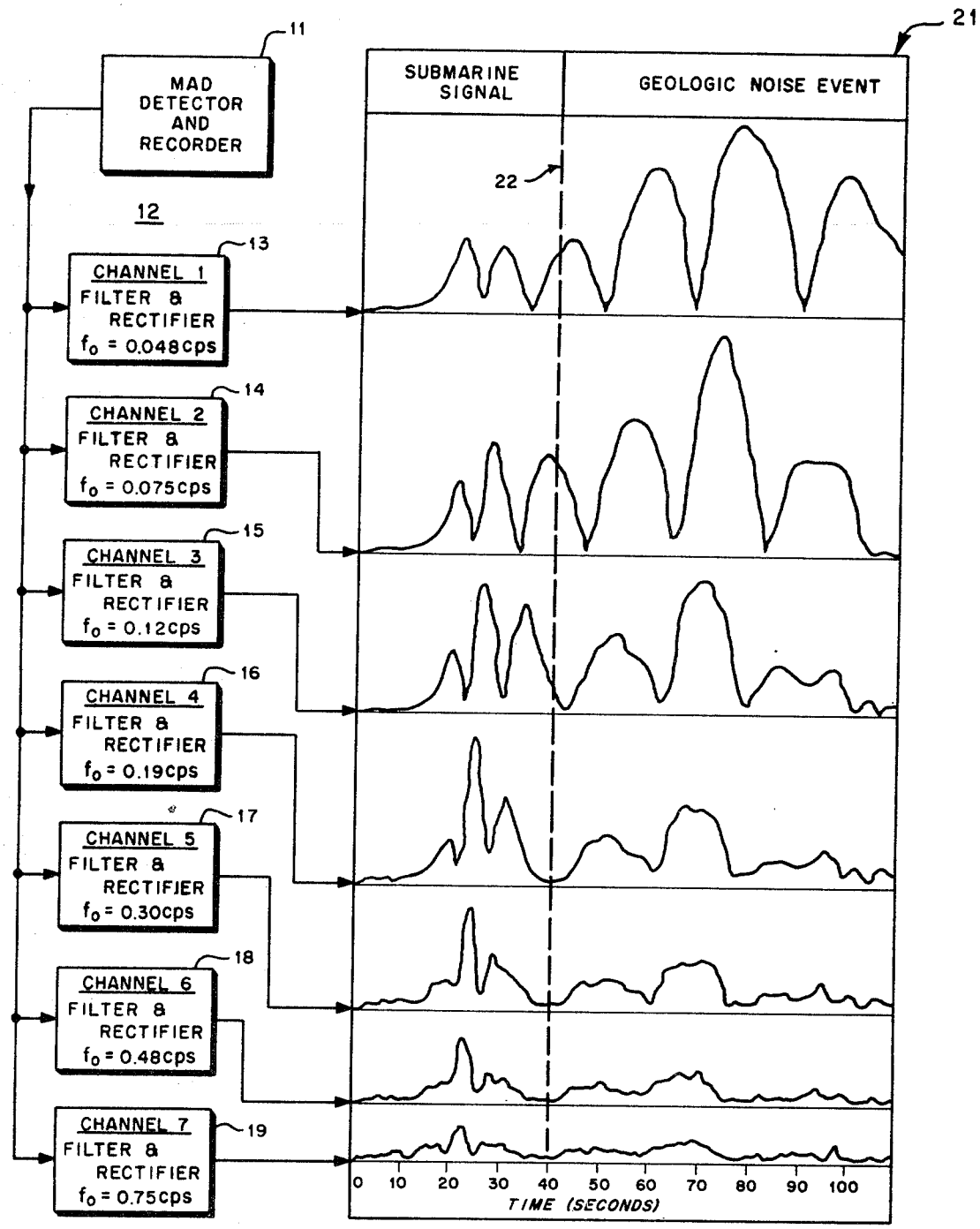
FIG. 1 illustrates a specific embodiment of the invention and the rectified filter outputs.

Referring now to the drawings, there is shown in FIG. 1 a specific embodiment of the invention wherein a MAD detector and recorder 11 are electrically connected together to detect and record transient time-domain signals of submarine signatures and geologic noise events. The output of the recorder is electrically connected to the inputs of a filter bank 12 having channels 1 through 7 and generally referred to as 13 through 19. Each channel consists of a constant low-Q bandpass filter with a different center frequency varying from 0.048 cycles per second to 0.75 cycles per second.

The function of each filter is to transform the transient time-domain signal (from the MAD record) to the frequency-time domain; that is, time waveforms of various filter frequencies. The output of each filter is electrically coupled to a full-wave rectifier which provides an output to a chart recorder 21 of a rectified signal for each filter, as shown in FIG. 1.

While a full-wave rectifier is employed in the specific embodiment to provide unidirectional signals, it should be noted that a squaring circuit which squares the amplitude of each cycle would function equally well.

Figure 2:
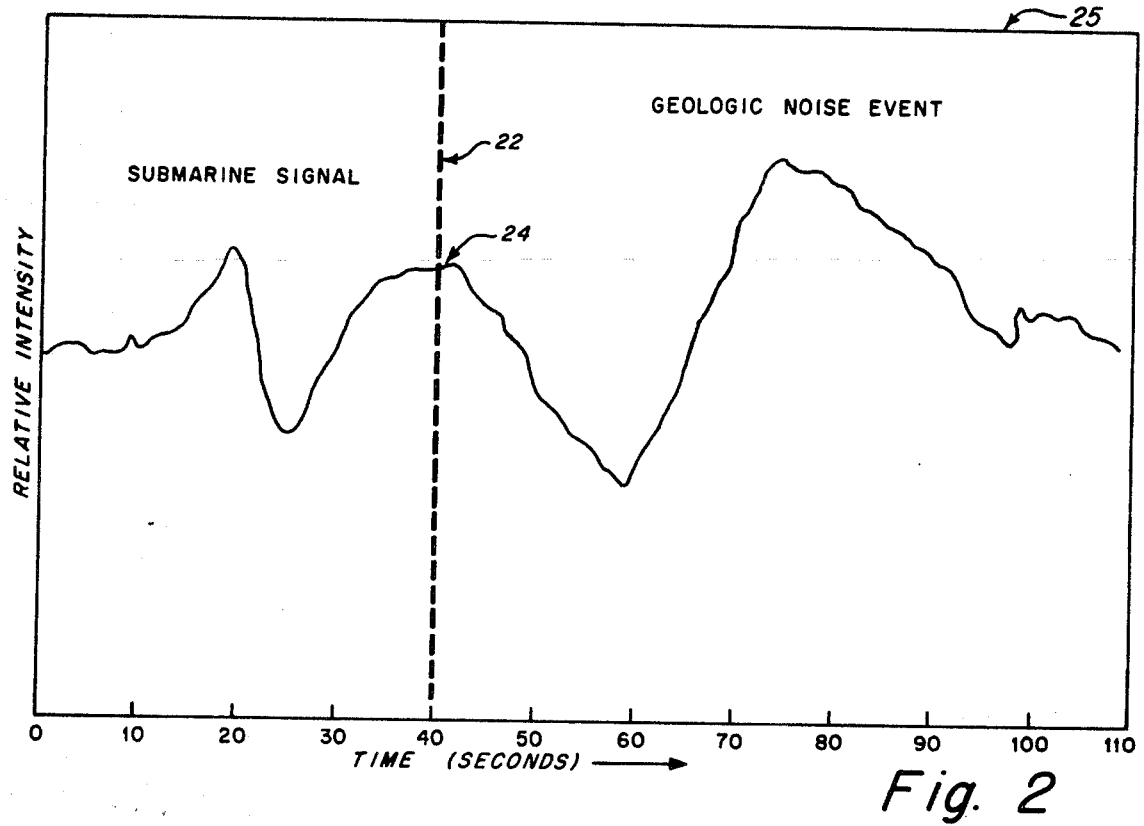
FIG. 2 illustrates typical transient signal and noise information from a MAD recorder.

Assume for the moment that the waveform 25 at the output of the MAD detector and recorder 11, as shown in FIG. 2, contains a submarine signal signature among random transient geologic noise and that this information is unknown to an operator attempting to determine if in fact a submarine is present. The first criteria for determining the presence of a submarine signal is the frequency at which maximum signal energy is obtained. This is accomplished by passing this record into the filter bank 12, as illustrated in FIG. 1. Each filter output signal from the lower frequency filters is found to contain three prominent lobes, either to the left or right of a line 22, with the central lobe on either side of the line being the most prominent. Considering for the moment only the central lobes in each channel to the left of line 22, it can then be seen that the maximum output amplitude occurs in filter channel 4. This maximum amplitude, being the highest of all the central lobes in all channels to the left of line 22 is referred to as the supremum.

From past experience in which known submarine signature information has been artifically combined with geologic transient noise in the recorded information, it has been found that submarine signals possess suprema in channels 4 or 5, or both, while on the other hand, signal-like geologic noise events almost always give rise to suprema in channel 2 at a later time. For the particular embodiment illustrated herein, submarine signal information exists in only the first forty seconds of time, hence line 22 divides the signal information from the noise information. In actual system operation, the submarine signal and geologic noise may, in fact, be superimposed or interchanged in time; however, the frequency at which the maximum energy occurs for the submarine signal and for the noise remains unaffected. Accordingly, regardless of the signal and noise time relationship, there is a clear and distinct spectral difference between submarine signals and their signal-like background noise. FIG. 1 illustrates this difference by showing a suprema in channel 4 and a maximum in channel 2 displaced in time from the suprema in channel 4.

Accordingly, the first of three unique features which provide evidence for making a decision on the presence or absence of a submarine has been disclosed; that is, the frequency at which the energy maximum for the submarine signal occurs is different from the frequency at which the energy maximum for the noise occurs.

The second distinguishing characteristic of a submarine signature in a noise environment is that of the time tracing of the peaks (maxima of the lobes) and troughs (minima) for the submarine signal differ from those of the signal-like background noise. This feature is best illustrated with reference to FIG. 3 which shows a three-dimensional plot of the information displayed in FIG. 1 and a two-dimensional plot of the MAD record of FIG. 2. The X-axis in the horizontal plane is the time axis for both the two-dimensional MAD record and the three-dimensional time-frequency amplitude display of the MAD record. The Y-axis in the horizontal plane is the frequency axis and the Z-axis in the vertical plane is the axis along which the output amplitudes of the filters are plotted. Each vertical plane therefore represents a filter output whose amplitude changes with time.

Figure 3:
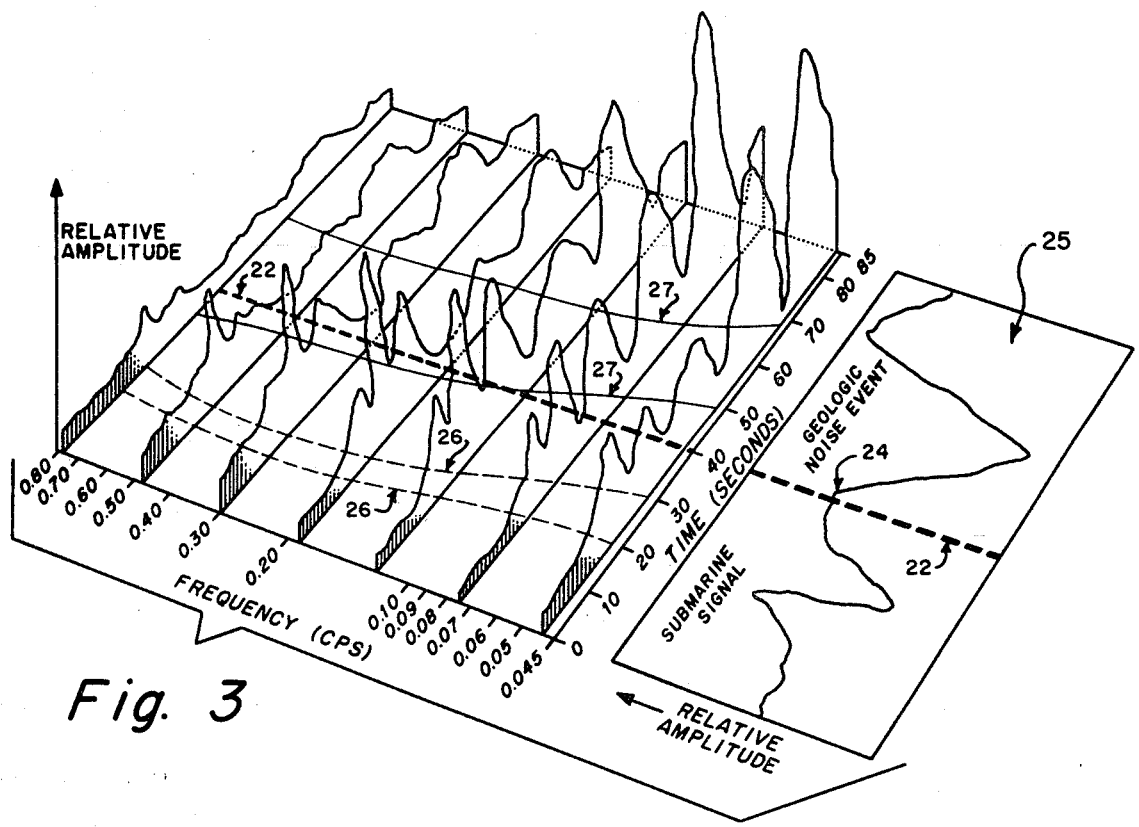
FIG. 3 illustrates a three dimensional view of FIGS. 1 and 2.

Since each filter is tuned to a different center frequency, each filter has a different response time, (the greater response times correspinding to the lower frequencies); accordingly, the lobes in each filter have a specific position in time. The larger the response time of a filter, the more its output signal is delayed. As expected, the plots of FIGS. 1 and 3 illustrate that the greater time shifts occur at the lower frequencies. From FIG. 1 it can be seen that the peak of the central lobe for the submarine signal occurs at 28.5 seconds from the origin in channel 1 and 25.5 seconds from the origin in channel 2.

The different times of occurrence of each lobe peak and trough may be plotted as a function of filter frequency, resulting in a time-tracing of the central lobes throughout the filters. FIG. 3 illustrates such a time-tracing on the three-dimensional plot, wherein a dashed line 26 connects a vertical projection of the peaks of the lobes in each filter on the frequency-time plane and a solid line 27 connects a vertical projection of the troughs between the lobes on the frequency-time plane. Similar time-tracings can be made for the peaks of the lobes to the left and to the right of the central lobe 24 and time-tracings may also be made for the troughs between the lobes, thereby forming time-tracings as shown in the lower portions of FIGS. 4 and 5 now to be described.

FIGS. 4 and 5 illustrate MAD submarine signals 31 and 32 and geologic noise signals 41, respectively. Signals 31, 32 and 41 are typical MAD submarine and noise signals as they would appear on a conventional MAD recording as illustrated in FIGS. 2 and 3. The lower graphs in FIGS. 4 and 5, represented by the horizontal lines numbered 1 through 7, depict the time-tracings for the seven filter output channels with the dashed lines indicating the time-tracings of the peaks of the lobes and the solid lines indicating the time-tracings of the troughs.

The time-tracings in FIG. 4 for the MAD submarine signal 31 show that the time-tracings converge at the higher frequencies whereas the time-tracings for the noise events as shown in FIG. 5 remain more or less parallel throughout the frequency range. Also, the submarine time-tracings of FIG. 4 bend or tilt toward the right, while the noise tracings again remain more or less straight and parallel. In addition, it can be seen that the separation between adjacent dashed and solid lines for the noise is greater than the separation between the successive lines for the signals.

Accordingly, the second unique feature which provides evidence for making a decision on the presence or absence of a submarine is that the characteristics of the time-tracings of the peaks and troughs for the submarine signals differ substantially from those of the signal-like background noise.

FIGS. 4 and 5 also illustrate the first feature of the signature recognition as pointed out with reference to FIGS. 1 and 2; that is, for submarine signals the suprema fall in channels 4 or 5 or both, the suprema being indicated in FIG. 4 by the circle on filter channel 4 and the suprema in noise events as indicated in FIG. 5 consistently appear in channel 2 as illustrated by the circle on filter channel 2.

The third unique feature which provides evidence for making a decision on the presence or absence of a submarine is that the ratio formed by the central lobe amplitudes of filter channels 1 and 7 has a range of values for submarine signatures that differs substantially from that for the geologic noise. For example, when a MAD record is impressed on the filter bank 12, the amplitude of the central lobes in the outputs of filter channels 1 and 7 have considerably different values. These differences are best illustrated with reference to FIGS. 1 and 3.

Therefore to establish the third unique feature of submarine recognition, the central lobe amplitudes in each filter output (for the signals and noise events) are plotted against filter center frequency in FIGS. 6a and 6b. As can be seen from the waveforms 61 and 62 of FIG. 6a which represent the central lobe amplitudes for MAD records 31 and 32 respectively, the channel 1 and channel 7 amplitudes are approximately the same. On the other hand, waveform 64 of FIG. 6b shows that the geologic noise events for channel 1 has a significantly higher amplitude than channel 7.

By dividing the amplitude of channel 1 by that of channel 7, a number is obtained that is called the shape factor. Using the relative amplitudes of the central lobes in channels 1 and 7 for the signal and noise events, it can be seen that the shape factor for a submarine signal is considerably different from that of the geologic noise events. In particular, for the examples illustrated in FIGS. 6a and 6b, the shape factor for the submarine signals is about 1.3 for waveform 61 and 0.78 for waveform 62. For the noise event, the shape factor is approximately 7.0. Accordingly, the shape factor shows a clear distinction between the submarine signals and the geologic noise.

From analyzing various MAD records containing submarine signals in a noise environment, it has been found that the shape factors for submarine signals cluster about the value of 1.0 and do not exceed 2.25, whereas for the noise signals the shape factors do not fall below 3.5.

Having thus described the three unique features which provide evidence for making a decision on the presence or absence of a submarine signal, the following examples will illustrate the usefulness of these features in separating submarine signals from geologic noise.

First, consider the MAD record 31 as illustrated in FIG. 4. The time-frequency analysis in the lower trace reveals that all the distinguishing submarine features are present: (a) feature 1 — the supremum is located in channel 4. (b) feature 2 — the time-tracings of the peaks and the troughs of the lobes converge at the higher frequency channels, the traces bend toward the right and the separation between adjacent time-tracings of the peaks and troughs is small. (c) feature 3 — the shape factor is approximately 1.3, which is well within the limits for submarine signatures.

As a second example, consider the MAD record 41 as illustrated in FIG. 5. The general shape of the waveform 41 is very similar to that of wave shape 31, however, it will be shown that the wave shape 41 represents a geologic noise event and not a submarine signal. Considering again the time-frequency analysis in the lower trace of FIG. 5, this record indicates features possessed only by geologic noise: (a) feature 1 — the supremum is located in channel 2 rather than in channels 4 or 5. (b) feature 2 — the traces remain more or less straight and parallel instead of converging at the higher frequency channels, the traces do not bend toward the right but again remain more or less straight and parallel and the separation between adjacent time-tracings of the peaks and troughs is large rather than small, (c) feature 3 — the value of the shape factor as illustrated in FIG. 6b is approximately 7, which is in the range of geologic noise. It may, therefore, be concluded that the event is not a submarine signal but rather geologic noise.

As a final and more challenging example of the accuracy with which the present system is capable of distinguishing submarine signals from a high noise environment, consider the MAD record 32 as illustrated in FIG. 4 wherein the submarine signal is completely undetectable by the human eye.

Looking again at the time-frequency analysis in the lower trace, the distinguishing features of a submarine signal will now be investigated: (a) feature 1 — the channel location of the supremum is not clear-cut occurring in either channel 2 or 6; hence, no conclusion can be drawn concerning the presence of a submarine signal from this particular feature. (b) feature 2 — the characteristic convergence and small separation are present, but the trace is erratic, making this evidence inconclusive. (c) feature 3 — despite the uncertainty of features 1 and 2, when the shape factor which is approximately 0.8 is considered, it is fairly conclusive that the MAD record 32 contains a submarine signature.

It can be readily appreciated from the above description of the operation of a specific embodiment of the invention that a distinction can be made between submarine signals and background transient noise even in high transient noise conditions; accordingly, by extracting the unique characteristics of a submarine signal from the signal-like background noise, it is possible for an operator to recognize submarine signatures previously undetectable.

It should be understood, of course, that the foregoing disclosure relates to only a specific embodiment of the invention and that numerous modifications or alternatives may be made therein without departing from the spirit and the scope of the invention as set forth in the appended claims.

I claim:

1. An apparatus for detecting submarine signatures in a signal-like noise background (as recited in claim 3 wherein said plurality of low-Q band pass filters further comprises) comprising:

means for receiving magnetic anomaly detection signals in the time-domain, said means including a magnetic anomaly detector for detecting variations in the earth's magnetic field caused by the presence of a submarine;

separator means electrically connected to said detector means for separating said signals into preselected frequency components, said separator means including a plurality of low-Q band pass filters having their inputs connected to said magnetic anomaly detector for separating said signals in the time-domain into preselected frequency components in the frequency-time domain, said plurality of (seven) band pass filters having center frequencies substantially of 0.048 cycles per second, 0.075 cycles per second, 0.12 cycles per second, 0.19 cycles per second, 0.30 cycles per second, 0.48 cycles per second and 0.75 cycles per second(.);

converter means connected to the outputs of each of said filters for converting said frequency components into signals having unidirectional lobes; and display means operatively connected to said converter means for displaying said signals having unidirectional lobes.

* * * * *